United States Patent [19]

Brown et al.

[11] 3,983,939
[45] Oct. 5, 1976

[54] METHOD FOR RECOVERING VISCOUS PETROLEUM

[75] Inventors: Alfred Brown, Houston, Tex.; Ching H. Wu, Golden, Colo.; Jack H. Park, Houston, Tex.

[73] Assignee: Texaco Inc., New York, N.Y.

[22] Filed: Oct. 31, 1975

[21] Appl. No.: 627,563

[52] U.S. Cl................................. 166/269; 166/272; 166/273
[51] Int. Cl.²................... E21B 43/16; E21B 43/22; E21B 43/24
[58] Field of Search............ 166/269, 272, 273, 274, 166/271, 303, 302, 306, 258; 299/4, 6

[56] References Cited
UNITED STATES PATENTS

| | | | |
|---|---|---|---|
| 2,725,106 | 11/1955 | Spearow | 166/306 |
| 2,859,818 | 11/1958 | Hall et al. | 166/269 |
| 2,910,123 | 10/1959 | Elkins et al. | 166/271 |
| 3,040,809 | 6/1962 | Pelzer | 166/303 |
| 3,118,499 | 1/1964 | Johnson et al. | 166/269 |
| 3,358,759 | 12/1967 | Parker | 166/269 |
| 3,441,083 | 4/1969 | Fitzgerald | 166/272 |
| 3,565,174 | 2/1971 | Parker et al. | 166/269 |
| 3,608,638 | 9/1971 | Terwilliger | 166/272 |
| 3,838,738 | 10/1974 | Redford et al. | 166/272 |
| 3,908,762 | 9/1975 | Redford | 166/272 |

FOREIGN PATENTS OR APPLICATIONS

| | | | |
|---|---|---|---|
| 1,112,956 | 5/1968 | United Kingdom | 166/272 |

*Primary Examiner*—Stephen J. Novosad
*Assistant Examiner*—George A. Suckfield
*Attorney, Agent, or Firm*—Carl G. Ries; Thomas H. Whaley; Jack H. Park

[57] ABSTRACT

Recovery of viscous petroleum from thick formations is especially difficult because thermal fluids or solvents needed to mobilize the viscous petroleum tend to channel through high permeability streaks in the formation, thereby bypassing large portions of the petroleum saturated formation. By forming or ensuring that there are naturally occurring high permeability strata in the upper portion and in the lower portion of the petroleum formation, and establishing separate communication means between the surface of the earth and the upper and lower high permeability strata, effective downward displacement may be achieved. A heated fluid such as steam is injected into one well in fluid communication with the lower high permeability strata to pass horizontally through the high permeability strata to another well which is also in fluid communication with the lower high permeability strata, sufficient to heat the lower high permeability zone to a temperature substantially above the ambient temperature of the formation. A solvent having a boiling point intermediate between the ambient temperature of the formation and the temperature to which the communication path is heated is injected into the heated communication path. The solvent vaporizes and moves up into the formation immediately thereabove to dissolve into the viscous petroleum. A gaseous substance is then injected into the upper high permeability strata to increase the pressure therein sufficiently to displace the mixture of viscous petroleum and solvent downward into the lower high permeability strata, wherein it is displaced horizontally to a remotely located well for recovery to the surface of the earth.

8 Claims, 1 Drawing Figure

U.S. Patent  Oct. 5, 1976  3,983,939
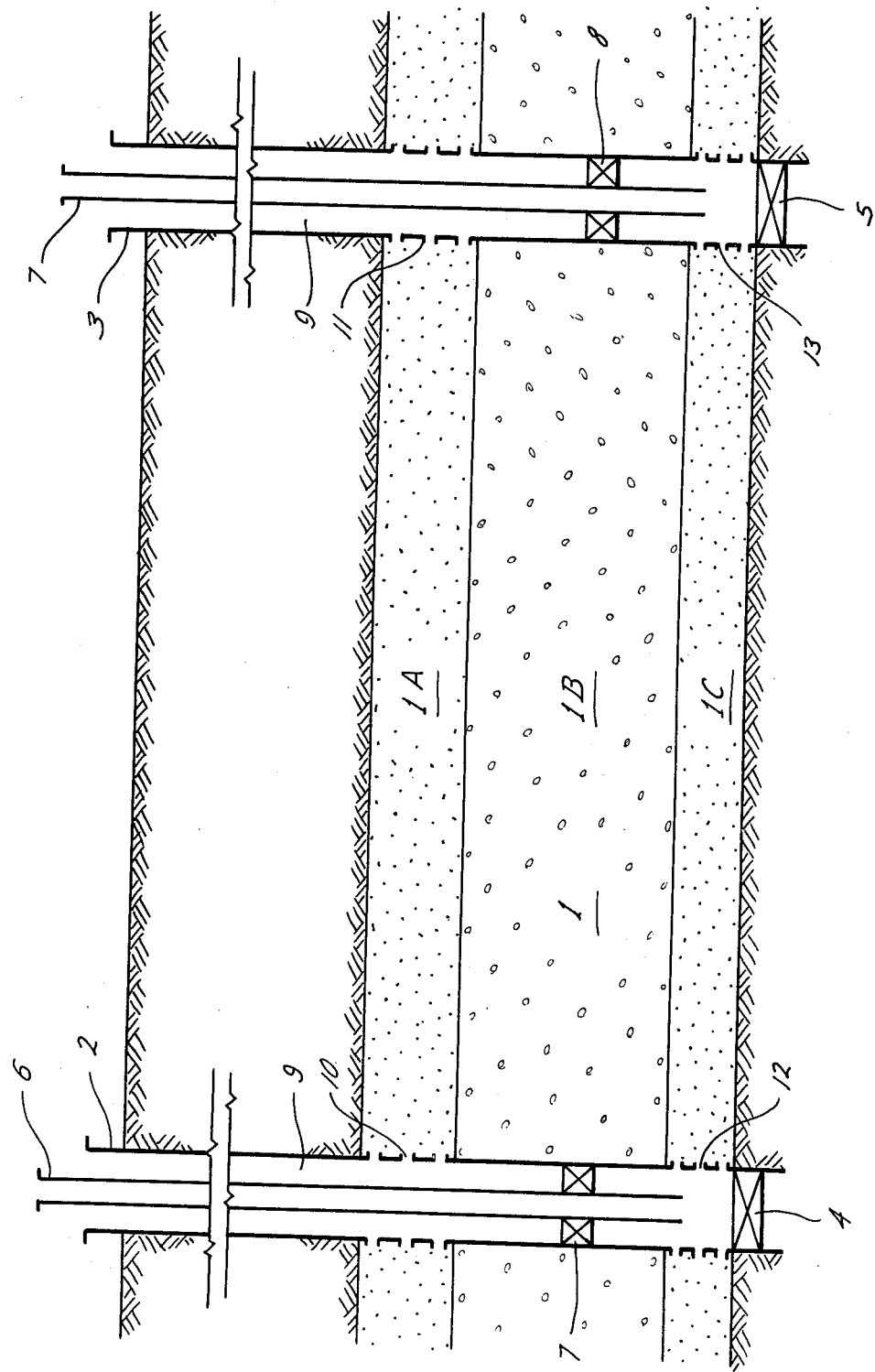

METHOD FOR RECOVERING VISCOUS PETROLEUM

BACKGROUND OF THE INVENTION

1. Field of the Invention

The present invention concerns a method for recovering viscous petroleum from subterranean viscous petroleum containing formations, and especially those formations which are relatively thick and which may have one or more high permeability strata which makes normal recovery methods ineffective because of channeling of the recovery fluid through the high permeability strata, thereby bypassing substantial amounts of petroleum. More specifically, this method employs a combination downward gas displacement, thermalsolvent method whereby viscous petroleum may be recovered from thick formations having one or a multiplicity of horizontally oriented thief zones or high permeability strata.

2. Description of the Prior Art

There are many subterranean, petroleum-containing formations in various parts of the world from which petroleum cannot be recovered efficiently by conventional means because the petroleum is too viscous to flow or be pumped. The most extreme example of viscous petroleum-containing formations are the so-called tar sands or bituminous sand deposits. The largest and most famous such deposit is the Athabasca Tar Sand Deposit in the Northeastern part of the Province of Alberta, Canada, which contains over 700 billion barrels of petroleum. Other extensive deposits are known to exist in the Western United States and in Venezuela, and other smaller deposits exist in Europe and Asia.

Tar sands are defined as sand saturated with a highly viscous crude petroleum material not recoverable in its natural state through a well by ordinary production methods. The petroleum constituent of tar sand deposits is a highly bituminous petroleum. The sand is generally fine quartz sand coated with a layer of water, with the viscous bituminous petroleum occupying most of the void space around the water wetted sand grains. The balance of the void space is filled with connate water, and some deposits contain small volumes of gas such as air or methane. The sand grains are packed to a void volume of about 35 percent, which corresponds to about 83 percent by weight sand. The balance of the material is bituminous petroleum and water, and the sum of bituminous petroleum and water is fairly consistently about 17 percent by weight, with the bitumen portion thereof varying from 2 percent to about 16 percent. In general, one of the characteristics of tar sand deposits which differs considerably from more conventional petroleum-containing formations is the absence of consolidated mineral matrix within the formation. While the sand grains are in contact, they are generally uncemented. The API gravity of bituminous petroleum present in tar sand deposits ranges from about 6 to about 8 and the specific gravity at 60° F. is from about 1.006 to about 1.027.

Methods described in the prior art for recovering bituminous petroleum from tar sand deposits include strip mining and in situ separation processes. Most of the recovery which has been accomplished up to the present time has been by means of strip mining, although this is economically feasible only when the ratio of overburden thickness to tar sand deposit thickness is around one or less. The majority of the petroleum known to exist in tar sand deposits is in formations too deep to be economically suitable for strip mining, so there is a serious need for some type of in situ recovery process wherein the bituminous petroleum is separated from the sand in the formation and recovered therefrom through a well or other production means drilled into the deposit.

In situ recovery processes described in the literature may be categorized as thermal techniques, including fire flooding or in situ combustion, and steam flooding, and emulsification drive processes, and combination of these processes. Any in situ recovery process must accomplish two functions: the viscosity of the crude petroleum must be reduced to a sufficiently low level that it is mobile, and sufficient driving energy must be applied to the crude petroleum to induce it to move through the formation to the production well or other means for transporting it to the surface of the earth.

Most of the in situ recovery processes discussed above involve the injection of a thermal fluid such as steam or air for in situ combustion into one well drilled into the formation, to move generally horizontally through the formation into a remotely located production well. If the tar sand deposit is relatively thick, i.e. in the range of 50 feet or more in thickness, and particularly if there are present in the tar sand deposits, one or more thief zones or intervals having permeabilities substantially greater than the permeability of the balance of the formation, the injected thermal fluid tends to channel through the high permeability strata, thereby bypassing substantial amounts of the petroleum-containing formation both above and below the high permeability strata. This results in the phenomena referred to as poor vertical conformance, and can reduce the volume of formations swept by the displacement fluid to a relatively small number, i.e., 10 to 30 percent of the total volume of the formation.

U.S. Pat. No. 3,838,738, Oct. 1, 1974, Redford et al. describes a method for recovering viscous petroleum from a subterranean formation involving forming a communication channel deep in the formation and injecting a thermal fluid and a solvent to cause vaporization of the solvent upward into the formation so the viscous petroleum is diluted and flows downward into the channel by force of gravity, from which it can be displaced to the surface of the earth.

Many prior art techniques deal with the problem of permeability thief zones in formations, but most are concerned with methods for treating the portion of the formation immediately adjacent the injection well to reduce its permeability. While this is initially effective, injected fluids quickly channel around the treated portion of the formation back into the thief zone and result in poor vertical conformance and poor displacement and consequently poor sweep efficiency.

In view of the foregoing discussion, it can be appreciated that there is a substantial need for a method applicable to thick, viscous petroleum-containing formations which contain one or more strata having permeability substantially greater than the remaining portions of formation, so as to effectively recover viscous petroleum without bypassing substantial portions of the formation with the injected recovery fluid.

SUMMARY OF THE INVENTION

Our invention comprises a method for recovering viscous petroleum from relatively thick, subterranean viscous petroleum-containing formations. The first step involves forming a high permeability zone in the upper portion of the formation, preferably at or near the top thereof, which extends laterally across the top of the formation. Next, a similar high permeability zone is formed in the lower portion of the formation, preferably at or near the bottom of the formation, similarly extending laterally throughout the full portion of the formation to be exploited. At least two wells are then drilled into the formation, and separate communication means are established between the surface of the earth and each of the two high permeability zones in each of the wells. A heated fluid is injected into the lower high permeability zone by at least one of the wells, and preferably is injected into one well to flow through the zone and out the other so as to heat the lower high permeability zone to a temperature substantially higher than the original ambient temperature of the formation. A solvent is introduced into this heated zone, which solvent has a boiling point intermediate between the temperature to which the high permeability zone has been heated and the ambient temperature existing in the portion of the formation above the heated high permeability zone in the lower portion of the oil formation. The solvent vaporizes upon contacting the heated zone and the vapor phase solvent freely moves up into the formation. The gaseous phase solvent may dissolve directly into the viscous petroleum contained in the intermediate zone, or it may condense at it cools and dissolve in the viscous petroleum, or both may occur simultaneously within various portions of the intermediate zone of the petroleum formation. The result is that solvent is introduced into the intermediate zone in sufficient depth to reduce the viscosity of the petroleum in that zone by a significant degree. A gaseous substance is then introduced into the upper high permeability zone by one or more wells, sufficient to increase the pressure therein to a value substantially greater than the pressure existing in either the intermediate zone or the bottom high permeability zone. The gaseous material may be a solvent such as carbon dioxide or low molecular weight hydrocarbons, or a relatively inert gas may be utilized. The gaseous substance present in the upper high permeability zone forces the mixture of viscous petroleum and solvent downward into the bottom high permeability zone, where it may be displaced by a suitable fluid to the remotely located production well, from which it is produced to the surface of the earth.

BRIEF DESCRIPTION OF THE DRAWING

The attached drawing illustrates in cross-sectional view a formation to which the process of our invention is being applied, showing the upper and lower high permeability zone and the central low permeability zone.

DESCRIPTION OF THE PREFERRED EMBODIMENTS

Basically, our process is comprised of the following essential steps, each of which will be treated in greater detail below:

1. Ensuring that there is a naturally occurring high permeability zone in the upper portion of the viscous petroleum formation, or forming such a high permeability zone.

2. Ensuring that there is a naturally occuring high permeability zone in the lower portion of the viscous petroleum formation, or forming such a high permeability zone.

3. Penetrating the formation with at least two wells and establishing separate communication means in each well between the surface of the earth and the top and bottom high permeability zones.

4. Injecting a thermal fluid into the bottom high permeability zone and either sequentially or simultaneously injecting a solvent into the bottom high permeability zone which solvent has a boiling point intermediate between the temperature of the thermal fluid and the ambient temperature of the formation located above the bottom high permeability zone.

5. Introducing a gaseous material into the top high permeability zone to displace viscous petroleum with solvent dissolved therein downward into the bottom high permeability zone.

6. Recovering petroleum which has been displaced downward by the gas introduced into the top high permeability zone into the bottom high permeability zone and pumping it or permitting it to flow to the surface of the earth.

I. Forming a High Permeability Zone in the Upper Portion of the Formation

It is desirable that there be present naturally or formed deliberately, a high permeability zone across the upper portion of the viscous petroleum formation which is essentially continuous and at or near the top of the formation from which petroleum is to be extracted by this process. For the purpose of this application, by high permeability zone, we mean a zone having a permeability substantially greater than the permeability of the bulk of the formation. It is desirable that the permeability be at least 25 percent greater than the permeability of the remainder of the formation, and it should be at least 50 and preferably at least 200 millidarcies in order to ensure good pressure distribution of the gaseous fluid in the top high permeability zone, and relatively free fluid flow through the bottom high permeability zone.

If a naturally occurring zone exists in the upper portion of the formation having a permeability substantially greater than the permeability of the central portion of the deposit, no initial treatment is necessary and the naturally occurring zone should be utilized if its permeability is sufficiently high. It is rare to find such a zone, however, and generally some additional treatment will be required. It is common to find a higher gas saturation in the upper portion of the formation than in the lower portion, which facilitates treatment of the formation so as to form the desired high permeability zone. This can be accomplished by establishing communication between two wells penetrating the formation with the upper portion of the formation, such as the zone in the attached FIGURE in which viscous oil-containing formation 1 is penetrated by wells 2 and 3 and a flow path is formed between the surface of the earth and the upper portion of the formation 1a by utilizing the annular space 9 between tubing 6 and the casing of well 2. Perforations 10 and 11 are formed in the casing of wells 2 and 3 so as to permit the passage of fluid between the annular space 9 and the upper portion of formation 1. The oil saturation may be decreased in the upper zone by simply passing steam or a low molecular weight, preferably normally gaseous solvent into the zone via either of the wells, for example, via well 2 to pass through the upper zone and out through perforations 11 to the surface of the earth. In the instance of using a low molecular weight gaseous solvent, the gravity difference between the injected gaseous solvent and the petroleum present in the formation will ensure that the solvent is maintained in the upper portion of the formation, usually in the top portion thereof so as to selectively deplete the upper portion of the formation, thereby forming the desired upper high permeability zone in the top of the formation. Solvents having a density greater than the density of formation petroleum, such as halogenated hydrocarbons or carbon disulfide, should not be used for the step of forming the upper high permeability zone, since they tend to move downward into the formation. Steam or a mixture of steam and low molecular weight gaseous hydrocarbon is also a satisfactory material and will be confined in the upper portion of the formation if a gaseous substance such as nitrogen or air is first injected through the formation for a period of time sufficient to create a gas swept zone in the upper portion of the formation, which will increase the permeability in the formation sufficiently to ensure that the steam preferentially channels through the upper portion of the formation. Examples of suitable gaseous solvents for use in forming the upper high permeability zone include carbon dioxide, methane, ethane, propane, butane, pentane, etc. In very low permeability formations it is sometimes necessary to pretreat the formation by gas sweeping such as by injecting air into the formation for a period of time prior to injecting the solvent or steam in order to achieve the desired gaseous solvent transmissibility in the formation. In exceedingly low permeability formations, hydraulic fracturing may be required in order to establish the desired initial permeability, with injection of steam or gaseous solvent or mixtures of steam and gaseous solvent through the upper portion of the formation to form the high permeability zone.

II. Forming the High Permeability Zone in the Lower Portion of the Formation

It is desirable to form a high permeability zone in the very bottom of the formation, occupying for example, the lower 10 to 20 percent of the vertical thickness of the formation, for the optimum practice of the process of our invention. Frequently viscous petroleum formations are found with naturally occurring water saturated zones underlying the petroleum zone, or zones containing higher water saturations than the bulk of the formation, and such high water saturations are helpful in forming the high permeability zone at the bottom of the formation. If the water saturation is sufficiently high, the water permeability of the lower zone will be 20 to 30 percent or more above the permeability of the central portion of the formation. In such instances, the permeability differential is sufficient to permit steam or steam and air or mixture of steam and solvent injection in the lower portion of the formation, with the injected fluid channeling through the water saturated zone to a remotely located well. For example, a mixture of steam and solvent may be injected into tubing 6 of well 2 to pass through perforations 12 into the lower zone of the formation. The steam and solvent will be confined to the lower portion of the formation because of the higher natural permeability thereof if the water saturation in the lower zone 1c is higher than the water saturation in the central zone 1b. Steam and solvent will pass through zone 1c and through perforations 13 of well 3, and pass through tubing 7 to the surface of the earth. Steam and solvent are effective for mobilizing petroleum in this lower zone, and displacing it from the zone to the surface of the earth, thereby reducing the oil saturation and increasing the permeability of the lower zone. Once the oil saturation has been reduced sufficiently to increase the permeability of lower zone 1c to a value at least 20 or 30 percent greater than the permeability of zone 1b, the next stage of the process may be applied.

If the formation does not exhibit a higher water saturation in lower zone 1c than in zone 1b, and the permeability in the lower portion of the formation is essentially the same as it is in the remainder of the formation, a slightly different procedure may be required to form the lower high permeability zone. Fracturing may be required initially, although this is usually necessary only in very tight formations. One effective means for forming the high permeability path or zone in the lower portion of the formation involves the use of heavy solvents, e.g. solvents for the viscous petroleum having a specific gravity greater than the specific gravity of the viscous petroleum at formation temperatures. Suitable heavy solvents include carbon disulfide, halogenated hydrocarbons which are essentially insoluble and unreactive with water, such as carbon tetrachloride or other chlorinated methanes, and mixtures thereof. Since the specific gravity of bituminous petroleum such as that found in tar sand deposits is frequently about equal to the specific gravity of water, it is generally necessary to select a solvent having a specific gravity greater than 1, which excludes most of the conventional hydrocarbon solvents such as natural gasoline or even the aromatic solvents such as benzene. If the specific gravity of the petroleum in the formation is not greater than 1, benzene may be used or a mixture of benzene and other hydrocarbon solvents in a suitable ratio to yield a specific gravity greater than the specific gravity of the bituminous petroleum for the purpose of forming the high permeability zone.

III. Injecting the Thermal Fluid and the Volatile Solvent

Once the desired high permeability zones have been formed in the top and bottom of the petroleum formation, the main recovery phase may be initiated. In this case a thermal fluid, preferably steam or a mixture of steam and solvent or steam and air is introduced into the formation to enter the bottom high permeability zone. Preferably the fluid is introduced by at least one well and caused to pass through the zone 1c and exit therefrom by a remotely located well. For example, steam may be introduced into the formation by means of tubing 6, entering the lower zone 1c through perforations 12 and passing through zone 1c to perforations 13 where it flows back to the surface of the earth. Steam injection may be continued for a period of time until it is determined that a substantial portion of zone 1c has been heated to a temperature substantially above the ambient temperature existing in zone 1b, preferably at least 50° greater than the temperature of zone 1b.

In one embodiment of the process of our invention, steam injection is continued until it is determined that a substantial portion or all of zone 1c has been heated to the desired temperature before any volatile solvent is introduced into the formation. Solvent may then be introduced into the lower zone 1c, either with discontinuous steam injection or the solvent may be introduced into the formation simultaneously with steam. The solvent is chosen so as to have a boiling point below the temperature to which zone 1c has been heated and preferably intermediate between the ambient temperature existing in 1b and the temperature existing in zone 1c after it has been heated by passage of steam or other heated fluid therethrough. Thus, the solvent will exist almost entirely as a gas in zone 1c, and so will migrate upwardly easily into the petroleum saturated zone 1b. Many formations which exhibit relatively low permeability to liquid flow are nonetheless easily penetrated by vapors such as gaseous propane or butane. A portion of the vaporized solvent will be absorbed directly from the vapor phase into the viscous petroleum, thereby reducing the viscosity of the viscous petroleum substantially. A portion of the solvent may be condensed as it loses heat upon passing into the cooler formation 1b, which further facilitates dissolution of visous petroleum and the solvents as the liquefied solvent is generally more effective for viscosity reduction purposes than the gaseous solvent.

The volume of solvent needed in this instance is relatively small, since if the heating fluid injection is handled properly, the solvent can be trapped in zone 1b and caused to reflux between the heated lower zone 1c and the upper zone 1b. Thus volumes of solvent as small as 1 but preferably at least 5 pore volume percent based on the pore volume of zone 1b in the swept area between wells 2 and 3 may be utilized for this purpose.

The solvents suitable for use in this process include any effective solvent for the petroleum contained in the formation, so long as the boiling point of the solvent is less than the temperature to which the lower high permeability path 1c is heated, and preferably the boiling point is intermediate between the temperature to which the lower zone 1c is heated and the upper zone 1b. If a solvent which is gaseous in both the lower zone and the upper zone is utilized, some benefit from the process of our invention will be achieved since the solvent will still migrate upward into the central zone of the formation and be absorbed directly from the gaseous phase into the petroleum and effect a reduction in the viscosity thereof. The best results are realized, however, when the solvent is chosen so that it will be gaseous in the lower zone and liquid in the central zone of the formation. This requirement that the boiling point of the solvent be intermediate between the temperature of the lower and central zone restricts the choices, but fortunately the materials which fit this requirement are commonly available hydrocarbons such as propane, butane, pentane, natural gasoline, etc. These are the especially preferred hydrocarbons for this purpose.

Other solvents, including carbon dioxide, carbon disulfide, and other volatile solvents, may also be utilized in this process. It should be noted, however, that vapor phase reaction sometimes occur between certain solvents including carbon disulfide and carbon tetachloride and steam, and this should be taken into account at least in determining the amount of solvent required as a portion thereof may be consumed in the reaction. Although the reactions are not detrimental to oil recovery, they do result in ultimate consumption of the solvent or conversion of a portion thereof into ineffective forms, and so will ultimately require additional solvent to be introduced into the formation. The low molecular weight aliphatic hydrocarbon solvents such as propane and butane do not undergo this type of reaction.

IV. Pressurization of the High Permeability zone at the Top of the Formation After the desired heating phase and volatile solvent introduction step has been accomplished, gas should be injected into zone 1a and the pressure therein increased to a value greater than the pressure existing in central zone 1b as well as in zone 1c. Generally the highest pressure in zone 1b or 1c will be the bottomhole pressure adjacent to the well into which steam or other fluid is being introduced, and it is only necessary to raise the pressure in the upper zone to a value substantially greater than the bottomhole pressure adjacent to perforations 12, in the injection well 2 in order to ensure that the desired positive pressure gradient between the upper zone and the lower zone in the formation is achieved.

Gases suitable for use in the gas injection phase of our process include inert gases such as nitrogen, air or gaseous solvents such as methane through butane or carbon dioxide. The principal requirement in this instance is that the specific gravity of gas at the injection pressure be substantially less than the specific gravity of the petroleum present in central zone 1b so as to ensure that the gas does not finger downward into the petroleum and bypass substantial portions of the formation. The reason for the requirement that the specific gravity of the gas be less than the specific gravity of the viscous petroleum is associated with the stability characteristics of the gas liquid system. Ordinarily gas is relatively ineffective when displacing liquid in a horizontal direction, but will displace a liquid efficiently in a downward direction if the specific gravity of the gas is substantially less than the specific gravity of the displaced liquid.

Gas may be injected into the top zone by only one well, so long as the other wells in fluid communication with zone 1a are closed off, since it is desired to increase the pressure in zone 1a rather than to simply pass gas through the high permeability zone. Preferably, gas injection will be accomplished in all of the wells in fluid communication with the upper zone in order to maintain a uniform pressure distribution within zone 1a. Since the permeability of the zone has already been reduced to a value substantially less than the zone therebelow, the pressure will tend to equalize in zone 1a. Gas injection is continued, maintaining the desired pressure which should be sufficient to displace the mixture of viscous petroleum and solvent in a downward direction. Solvent and petroleum will be displaced into the high permeability zone 1c, and fluid injection should be maintained horizontally through zone 1c in order to maintain the high permeability condition existing therein. Ordinarily the preferred method is to continue injecting steam into zone 1c via one well and recovering steam or steam condensate from a remotely located well. The flow of steam and other fluids through the zone is sufficient to displace petroleum and solvent which is displaced downward by the gas, toward the remotely located production well.

FIELD EXAMPLE

For the purpose of additional disclosure of the preferred method of operating the process of our invention but without intending that it be limitative or restrictive of our invention, the following field example is presented.

A tar sand deposit is located at a depth of 2,500 feet and it is determined that the average thickness of the deposit is 100 feet. The petroleum saturation is approximately 45 percent by volume. The viscosity of the petroleum is so high that it is essentially immobile at formation temperatures and no production by primary means is possible. The formation temperature is 40° F and the in situ permeability is 30 millidarcies.

Two wells are drilled to the bottom of the formation, and completed essentially as is shown in the attached FIGURE. Plugs 4 and 5 are set at a point about even with the very bottom of the formation, and perforations 10 and 11 are formed in the two wells in the top 10 feet of the formation and perforations 12 and 13 are formed in the wells in the bottom 10 feet of the formation. Tubing strings 6 and 7 are run to a point about even with the center of perforations 12 and 13 in the wells and bridge plugs 7 and 8 are set between the upper and lower perforations so as to isolate the annular space above the plug from the opening of the end of the tubing strings. As completed, the annular space of the two wells are in fluid communication with the upper 10 feet of the formation and the tubing strings are in fluid communication with the lower 10 feet of the formation.

As the first step, propane is introduced into the upper portion of the formation via perforations 10 and the annular space of well 3 is open to the atmosphere to permit production of propane. Propane passes through the upper portion of the formation, dissolving petroleum and displacing petroleum and solvent toward well 3 wherein it is produced to the surface of the earth. The propane is confined to the upper portion of the formation by its specific gravity, and ultimately reduces the oil saturation to about 20 percent in the upper 10 feet, as a result of which the permeability is increased to about 210 millidarcies, which is adequate for our purpose.

There is essentially no water saturation in the lower portion of the formation, and so air is injected first in via tubing 6 to pass through the lower portion of the formation and out through tubing 7 to form a gas swept zone in the formation. After this has continued for about twenty-four hours, initial permeability is achieved sufficient to prevent introduction of liquid solvent into the formation. Carbon disulfide is pumped into the lower zone to dissolve in the viscous petroleum. If the permeability of the formation is so low that it is impossible to pass solvent from well to well, it may be necessary to inject carbon disulfide via both wells to penetrate into the formation adjacent perforations 12 and 13, after which both wells are backflowed to recover carbon disulfide and viscous petroleum from the formation and thereby reduce the oil saturation to a level such that well to well communication may be achieved. Since the specific gravity of carbon disulfide is substantially greater than the specific gravity of formation petroleum, the solvent is confined to the very lower portion of the formation and no invasion of the upper portion of the formation occurs. After the first cycle in which solvent is injected into both wells and backflowed to both wells, carbon disulfide is injected into well 2 and production is taken from well 3 for a period of one week, after which time the lower portion of the formation has been depleted of petroleum so as to increase its permeability to about 210 millidarcies, which is quite sufficient for our purpose.

Having completed formation of high permeability zones in both the upper and lower portion of the formation, the next step is to begin injecting steam into the lower portion of the formation in order to heat the high permeability zone. Since it is known that steam and carbon disulfide react, water is first passed through zone 1c to displace the residual carbon disulfide toward the production well, from which it is recovered for re-use in another area. Steam is then injected into the lower portion of the formation via tubing 6 to enter into the high permeability zone 1c via perforations 12, and tubing 7 is opened to the atmosphere to permit flow of fluids therefrom. Steam flow through the formation is continued for approximately four days, until it is determined that the portion of high permeability zone 1c has been heated throughout most of the area between the two wells.

Propane is then injected into zone 1c, with steam injection being temporarily discontinued. Approximately 10,000 barrels of propane is injected, after which steam injection is resumed. The propane is vaporized upon contacting heated high permeability zone 1c, and vapor phase propane flows upward into the low permeability, high oil saturation zone 1b and dissolves in the viscous petroleum.

Simultaneously with the continuation of steam injection in zone 1c, natural gas injection is initiated into zone 1a. Gas is injected via the annular space of both wells 2 and 3 in order to bring the pressure in zone 1a up to a value of about 450 pounds per square inch, after which gas injection is continued only in an amount sufficient to maintain the pressure in zone 1a at a value of about 450 pounds per square inch. The combined effect of the thermal fluid heating at least a portion of the oil in zone 1b, together with the effect of the solvent introduced into zone 1c which has migrated upward into 1b, and dissolved in the viscous petroleum, together with the downward displacing effect of gas contained in zone 1a, causes relatively complete displacement of the petroleum in zone 1b in a downward direction. Petroleum is displaced horizontally after it passes into zone 1c by the steam which is being injected therethrough, and steam, steam condensate and petroleum are produced from well 3 via tubing 7. Gas injection is continued until there is an indication of gas production from tubing 7, which indicates that gas has broken through into the lower zone 1c, at which time approximately 78 percent of the viscous petroleum originally present in the portion of the formation affected by the application of this procedure, has been recovered.

While our invention has been disclosed in terms of a number of illustrative embodiments, it is not so limited since many variations thereof will be apparent to persons skilled in the art of oil recovery without departing from the true spirit and scope of our invention. Similarly, a number of mechanisms have been described in the course of explaining the benefits resulting from the application of the process of our invention to a viscous oil containing formation, although it is not necessarily hereby implied that these are the only mechanisms or even the principal ones responsible for the benefits resulting from the application of our process to an oil formation. It is our intention and desire that our invention be restricted and limited only by those limitations and restrictions as appear in the claims appended hereinafter below.

We claim:

1. A method of recovering viscous petroleum including bituminous petroleum from a subterranean viscous petroleum containing formation including a tar sand deposit, the thickness of said formation being at least 50 feet, said formation being penetrated by at least two spaced apart wells, each well containing separate flow paths between the surface of the earth and both the upper and lower portions of the formation, comprising, a. forming a zone in the upper portion of the formation having a permeability substantially greater than the original permeability in the formation, said zone of high permeability extending substantially uniformly at or near the top of the formation between the wells;

b. forming a second zone in the lower portion of the formation having a permeability substantially greater than the original permeability of the formation, said zone of higher permeability extending essentially uniformly at or near the bottom of the formation between the wells;

c. introducing a thermal fluid into the lower high permeability zone by one of the wells, the temperature of the fluid being at least 50° higher than the ambient temperature of the formation;

d. introducing a solvent into the lower high permeability zone by the same well as is used for introduction of the heated fluid, the solvent having a boiling point substantially lower than the temperature of the heating fluid;

e. introducing a gaseous substance into the zone of higher permeability in the upper portion of the formation to increase the pressure therein to a value substantially greater than the pressure in either of the zones located therebelow; and f. continuing introduction of a thermal fluid into the lower zone of higher permeability by at least one of the wells while recovering petroleum via a remotely located well from the lower zone of high permeability.

2. A method as recited in claim 1 wherein the zone of higher permeability in the upper portion of the formation is formed by introduction of a gaseous solvent into the formation by at least one of the wells and recovering the solvent with petroleum dissolved therein from at least one remotely located well so as to reduce the petroleum saturation and increase the permeability of the zone in the upper portion of the formation.

3. A method as recited in claim 1 wherein the zone of higher permeability in the lower portion of the formation is formed in a formation having appreciable water saturation in the lower portion of the formation by introduction of a thermal fluid including steam into the lower portion of the formation via at least one well and recovering petroleum and steam from the lower portion of the formation via at least one spaced apart well.

4. A method as recited in claim 1 wherein the gaseous substance introduced into the upper high permeability zone is selected from the group consisting of air, nitrogen, natural gas, methane, ethane, propane, butane, and mixtures thereof.

5. A method as recited in claim 1 wherein the zone in the lower portion of the formation having a permeability substantially greater than the original permeability of the formation is formed at or near the bottom of the oil formation by introducing a solvent having a specific gravity substantially greater than the specific gravity of the formation petroleum into the lower portion of the formation by at least one well and recovering solvent and petroleum from at least one spaced apart well from the lower part of the formation.

6. A method as recited in claim 1 wherein the thermal fluid introduced into the zone of higher permeability in the lower portion of the oil formation is selected from the group consisting of steam, a mixture of steam and air, or a mixture of steam and a low molecular weight hydrocarbon solvent.

7. A method as recited in claim 1 wherein the solvent having a boiling point substantially less than the temperature to which the lower zone of high permeability is heated is selected from the group consisting of carbon dioxide, methane, ethane, propane, butane, natural gasoline, and mixtures thereof.

8. A method as recited in claim 1 wherein the solvent having a boiling point less than the temperature to which the zone of increased permeability in the lower portion of the oil formation has been heated, is selected from the group consisting of carbon disulfide, carbon tetrachloride, halogenated hydrocarbon which are unreactive with and insoluble in water, and mixtures thereof.

* * * * *